Oct. 13, 1936.   C. K. BRYCE ET AL   2,057,133
MULTISTAGE PRESSURE REGULATOR
Filed Nov. 30, 1929   2 Sheets—Sheet 1
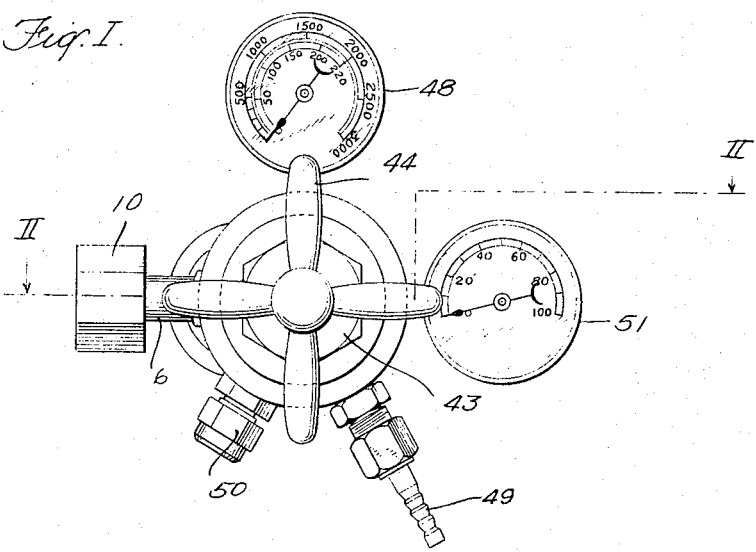
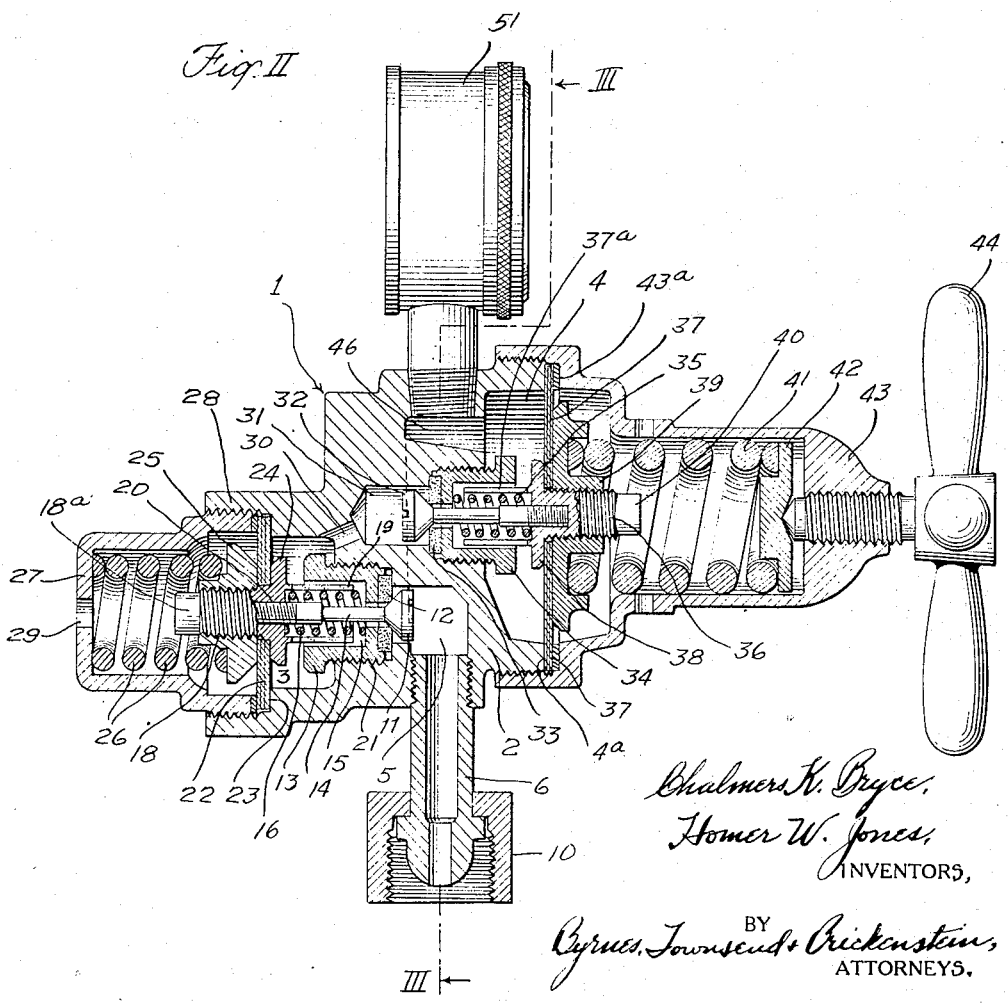

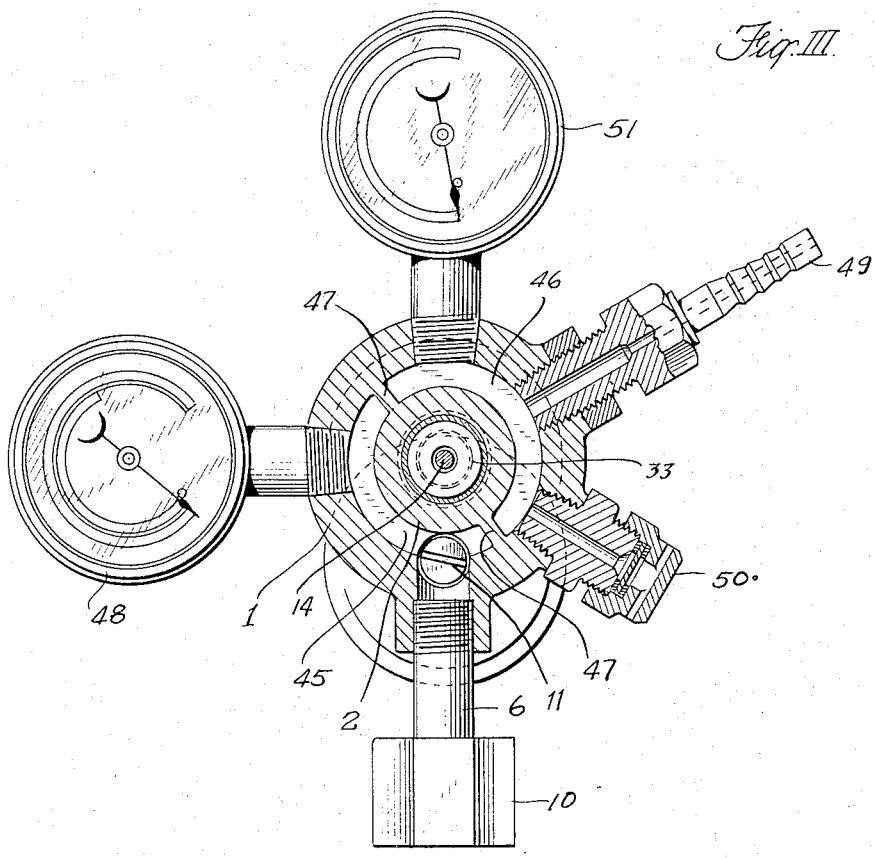

Patented Oct. 13, 1936

2,057,133

UNITED STATES PATENT OFFICE

2,057,133

MULTISTAGE PRESSURE REGULATOR

Chalmers K. Bryce, Cranford, N. J., and Homer W. Jones, Williamsville, N. Y., assignors, by mesne assignments, to Union Carbide & Carbon Corporation, a corporation of New York Application November 30, 1929, Serial No. 410,783

20 Claims. (Cl. 50—23)

Our invention relates to pressure regulating and reducing valves having a plurality of stages for reducing the pressure of compressed gases, and particularly for reducing the pressure of highly compressed gases, such as are used in gas welding, to a comparatively low working pressure.

The gases used in gas welding are compressed in tanks at a high pressure and are delivered to the gas torch at a comparatively low working pressure. To obtain uniform results, it is necessary to maintain the working pressure constant. As an example, oxygen is compressed in tanks to about 2000 lbs. pressure and is delivered to the torch at between 1 and 50 lbs. When it has been attempted to reduce the pressure of the gas from the upper pressure to the lower pressure in one step, the fluctuation of the working pressure delivered to the torch has been found to be too great in some instances to produce good welds, due to the fact that a change of a few ounces in pressure will alter the character of the welding flame.

Heretofore, separate pressure regulators have been used in series in a gas line to reduce the pressure of gases by successive stages as it passes through each regulator. Such apparatus is bulky, unbalanced and cumbersome, and tends to make the compressed gas tanks to which they may be attached top heavy. More compact devices for regulating and reducing gas pressure by successive stages of pressure reduction have been made in one unit for use in gas lighting systems, particularly for automobiles. These one unit multi-stage pressure regulating and reducing valves are so constructed that the parts are inaccessible and cannot be easily removed for adjustment and cleaning, and when adapted for use on a gas tank they also project too far over the base of the tank.

Therefore, the principal object of our invention is to construct a compact pressure multistage regulating and reducing valve adapted to reduce a compressed gas to a constant non-fluctuating low working pressure.

A further object of our invention is to construct and arrange the parts so that they can be easily replaced, adjusted and cleaned.

A further object of our invention is to construct a regulator so that its center of gravity will lie near the longitudinal axis of the gas tank to which it may be attached.

Other objects of our invention will be understood from the following detailed description of the device disclosed in the accompanying drawings in which, Fig. I is an elevational view of our pressure regulator;

Figs. II and III are cross sectional views on line II—II of Fig. I and line III—III of Fig. II, respectively.

The mechanism of our multi-stage pressure regulating and reducing valve is conveniently and compactly arranged in and on a one piece chambered valve body 1. A partition 2 lying in a central zone in the body 1 separates small intermediate pressure stage or chamber 3 from a larger low pressure stage or chamber 4, which latter stage delivers gas at a constant working pressure. The high pressure gas is delivered to the high pressure stage or chamber 5 in the valve body 1 through a nipple 6 which may be attached to a compressed gas tank outlet by means of the union coupling nut 10.

The passage of the gas from the high pressure stage 5 to the intermediate pressure stage 3 is controlled by a valve 11 operated in response to the pressure in the intermediate stage. The valve 11 seats on a valve seat 12 maintained in place by a valve seat plug 13, through which the stem 14 of the valve 11 passes. The valve seat plug 13 is provided with a central cavity 15 to receive a spring 16, which fits around the valve stem 14 and rests on the bottom wall of the cavity. A diaphragm attaching screw 18 is provided with annular slotted projections 19, which fits loosely into the cavity of the valve seat plug 13 around the spring 16. The diaphragm attaching screw 18 is provided with a centrally threaded bore 20 into which the end of the valve stem 14 is screwed. The parts so assembled are secured in the valve body 1 by the engagement of the external threads on the valve bushing 13 with threads in the bore 21 in the valve body 1 within which the bushing is screwed. The bushing is screwed up until the valve seat 12 is clamped between the valve bushing 13 and a shoulder in the bore which receives the bushing.

It will be noted that the valve seat plug 13 is secured into the bore 21 of the valve body 1 from the outlet side of the valve 11. This arrangement places the valve closing spring 16 on the outlet side of the valve 11 and within the reduced pressure chamber 3 where an enlarged space may be provided for the spring without increasing the size of the pressure chamber. This location of the valve closing spring within the pressure chamber 3 permits the use of a larger diameter spring coil 16 and a proportionately shorter spring which reduces the length of the regulator without increasing the size of the regulator and at the same time the spring 16 does not materially obstruct the passage of gas through the regulator.

The outer end of the gas-chamber 3 of the intermediate pressure stage is closed by a circular diaphragm 22 resting on a shoulder 23 on the valve body 1 at the end of the chamber 3. The diaphragm 22 has a central aperture therein which receives the threaded extension 18a of the attaching screw 18, and the diaphragm is attached to the attaching screw 18 between a flange 24 on the screw and a diaphragm clamping nut 25 screwed on the extension 18a on the attaching screw 18. A coiled spring 26 rests on the clamping nut 25 and is compressed between the nut and the inside of the outer end of a hollow cap 27, whose inner end is provided with screw threads and is screwed into the diaphragm cavity 28 to hold the rim of the diaphragm 22 in gas leak proof contact with the shoulder 23 on the valve body 1, and to compress the spring against the action of the diaphragm 22 and the smaller spring 16 in the valve bushing cavity. A hole 29 is provided in the top of the cap to permit the ingress and egress of air to and from the inside of the cap 27.

A passage 30 in the valve body 1 extends from the gas chamber 3 to a chamber 31 which receives a valve 32 for controlling the passage of gas from the intermediate pressure stage 3 to the low pressure stage 4. The construction of this valve and its control mechanism is similar to the construction of the valve and control mechanism for the valve 11 which controls the passage of gas from the high pressure stage to the intermediate pressure stage. The valve 32, valve seat 33, valve seat plug 34, spring 35 and diaphragm attaching screw 36 may be duplicates of the corresponding parts used in the intermediate pressure stage and are assembled in the chamber 4 of the low pressure stage in the same manner as the corresponding parts are assembled in the intermediate pressure stage. The diameter of the chamber 4 of the low pressure stage, the effective area of the diaphragm 37 that closes the chamber and the diaphragm spring 41 are made larger than the corresponding elements of the intermediate pressure stage due to the lower pressure maintained in the low pressure chamber 4, and in order to obtain a more accurate regulation of the pressure in the latter chamber. The diaphragm 37 is clamped between the flange 38 on the diaphragm attaching screw 36 and a clamping nut 39 screwed on the threaded extension 40 of the screw 36. One end of an adjustable coiled spring 41 fits in a socket on the clamping nut 39 and a washer 42 is seated on the other end. A hollow cap 43 fits over the spring 41 and the diaphragm 37 and is screwed to the walls of the low pressure chamber 4. The outer end of the low pressure chamber 4 is sealed by the diaphragm 37 whose outer perimeter is clamped between the end walls 4a of the chamber 4 and an internal shoulder 43a on the end of the cap 43. The tension of the spring 41 may be adjusted by an adjusting hand screw 44 which passes through the head of the cap 43 and contacts with the spring washer 42.

An arcuated groove 45 is formed in the partition 2 of the valve body 1 and extends from the high pressure stage inlet 6 around a portion of the circumference of the valve body. A similar groove 46 is formed in the valve partition 2 and communicates with the low pressure stage 4. The high pressure groove 45 is separated from the low pressure groove 46 by partitions 47 in the valve body. A high pressure gauge 48 is connected to the high pressure groove 45 and a discharge nipple 49, a safety plug 50 and a low pressure gauge 51 are connected to the low pressure groove 46.

When our pressure regulating aud reducing valve is not in operation, the diaphragm springs 26 and 41 force the pressure stage control valves 11 and 32 off their seats, in opposition to the force exerted by the smaller springs 16 and 35 on the opposite sides of the respective diaphragms 22 and 37. In this position the projections 19 and 37a on their respective diaphragm attaching screws rest on the bottom of the cavity in the valve seat plugs 13 and 34 and prevent the diaphragms from being strained by the continued force of the springs 26 and 41. When the gas is admitted to the high pressure stage of the regulator through the inlet 6, it will flow through the passages in the valve casing 1 until a predetermined pressure is built up in the intermediate and low pressure stages. The gas pressures in the intermediate and low pressure stages 3 and 4 will then act upon the diaphragms of the respective stages and cause the controlling valves 11 and 32 to cut off communication between the pressure stages.

The diaphragm spring 26 of the intermediate pressure stage is designed to reduce the supply pressure to a substantially lower pressure, that is in practice to about 100 lbs. per square inch. This pressure should exceed the maximum pressure delivered by the low pressure stage but is preferably maintained low so that the effective load maintained on the intermediate pressure diaphragm, having a smaller effective area than the effective area of the low pressure diaphragm, will be less than the effective load on the low pressure diaphragm in order that a smaller diaphragm spring as well as a smaller diaphragm may be used in the intermediate pressure stage than is required in the low pressure stage. The pressure maintained in the intermediate pressure stage may, however, be varied by changing the spring 26 for one of a different strength. The spring 26 is made non-adjustable to prevent the operator of the regulator from changing the pressure setting of the intermediate pressure stage and thereby allow excessive pressure to accumulate in the intermediate pressure stage. The gas under the excess pressure may rush into the low pressure stage and injure the diaphragm 37 therein before the valve 32 can close the passage which connects the two stages.

In reducing the high pressure of the tank gas to the intermediate pressure, the gradually decreasing tank pressure acting on the exposed surface of the intermediate pressure stage controlling valve 11 causes the valve to open and close in response to a pressure greater than that at which it responded when the tank was under a higher pressure, and therefore, the pressure maintained in the intermediate pressure chamber increases with a given spring 26 as the gas pressure in the tank decreases. Sometimes the moisture in gas freezes as it expands from the high pressure stage to the intermediate pressure stage, and these frozen pellets clog the valve opening and produce pressure impulses in the reduced pressure. While these variations in pressure in the intermediate pressure stage are great enough to deleteriously affect the character of a welding torch flame supported by the gas, they are not great enough to materially affect the regulating action of the low pressure stage control valve 32. The gas absorbs sufficient heat in the intermediate pressure stage to melt any pellets of frozen moisture that may have been formed and the reduction in pressure between the intermediate pressure stage and the low pressure stage is not sufficient to cause the reformation of these pellets. Due to the substantially constant reduced pressure maintained in the intermediate pressure stage the gas passes therefrom to the low pressure stage without producing any irregular action in the low pressure stage control valve such as is produced in the action of the intermediate pressure control valve. The low pressure control valve is therefore capable of maintaining a constant working pressure in the low pressure stage.

It will be noted that the inlet to and the discharge from the valve casing, and the pressure gauges and the safety plug, are conveniently arranged around the circumference of the valve casing in the central plane of the partition 2 in the valve body, and that the intermediate pressure stage and the low pressure stage are located on opposite sides of this plane. This construction gives a compact arrangement of the parts and places the center of gravity of the regulator close to the longitudinal axis of the compressed gas tank when the inlet of the regulator is attached to the outlet from the tank.

While we have shown the preferred form of our invention, we wish it to be understood that changes may be made in the form shown without departing from the scope of our invention as defined in the appended claims.

We claim:

1. A multi-stage regulator comprising a unitary body having a gas inlet and a gas outlet, means for partially reducing the pressure of gas supplied through the inlet at a pressure of approximately 70 atmospheres or more, said means including a valve, a diaphragm and yielding means for actuating said valve; and means for further reducing the pressure of the gas, the last-mentioned means including a second valve, a second diaphragm, and means for actuating the second valve.

2. A multi-stage regulator comprising a unitary body having a gas inlet and a gas outlet, means for partially reducing the pressure of gas supplied through the inlet at a pressure of approximately 70 atmospheres or more, said means including a valve, a diaphragm and yielding means for actuating said valve; means for further reducing the pressure of the gas, the last-mentioned means including a second valve, a second diaphragm, and means for actuating the second valve; and means for adjusting the pressure of the gas delivered from the outlet.

3. A multi-stage fluid-pressure regulator comprising a unitary body having a gas inlet and a gas outlet, means therein for reducing the pressure of high pressure gas supplied through the inlet, said means including a valve, a diaphragm and yielding means for actuating said valve; and means for further reducing the pressure of the gas, the last-mentioned means including a second valve, a second diaphragm, and means for actuating the second valve; the said body having therein ports for gauges to indicate the pressures of the incoming and outgoing gases.

4. A multi-stage fluid-pressure regulator adapted for reducing the pressure of high pressure gases, the said regulator comprising a unitary body provided with inlet and outlet passages and also provided with ports for gauges in the said body communicating with the respective passages to indicate the pressures of the incoming and outgoing gases, the said body also being provided with a port having therein means for venting the said body when the gas therein attains a predetermined pressure.

5. A multi-stage fluid-pressure regulator comprising a unitary body having a gas inlet and a gas outlet, means in the body for reducing the pressure of gas supplied through the inlet at a pressure of approximately 70 atmospheres or more, said means including a valve, a diaphragm, and yielding means for actuating said valve; means for further reducing the pressure of the gas, the last-mentioned means including a second valve, a second diaphragm, and means for actuating the second valve; and means for adjusting the pressure of the gas delivered from the said outlet; the said body having therein ports for gauges to indicate the pressures of the incoming and outgoing gases.

6. A multi-stage pressure regulator for reducing and regulating the pressure of high pressure gases, comprising a unitary valve body; a transverse partition formed in said valve body; an intermediate pressure chamber and a low pressure chamber respectively formed in said valve body on opposite sides of said partition; a pressure-responsive diaphragm forming a wall of said intermediate pressure chamber; a larger diaphragm forming a wall of said low pressure chamber; a short passage through the partition connecting the respective chambers; a high pressure inlet passage and a high pressure gauge port formed in the valve body and in communication with the intermediate pressure chamber; a low pressure outlet, a low pressure gauge port, and a pressure relief port formed in the valve body and respectively in communication with the low pressure chamber; and valves in the respective passages.

7. A multi-stage pressure regulator comprising a unitary valve body; a transverse partition formed in said valve body; an intermediate pressure chamber and a low pressure chamber formed in said valve body on the respective sides of said partition; a pressure-responsive diaphragm forming a wall of the intermediate pressure chamber; a larger diaphragm forming a wall of the low pressure chamber; a short passage through the partition connecting the respective chambers; a high pressure inlet, and a high pressure gauge port formed in the valve body and operatively connected with the intermediate pressure chamber; and a low pressure outlet, and a low pressure gauge port, formed in the valve body and respectively in communication with the low pressure chamber; the respective gauge ports, high pressure inlet and low pressure outlet being arranged in the same general transverse plane through the valve body.

8. A multi-stage pressure regulator comprising a unitary body provided with a high pressure inlet chamber, a low pressure outlet chamber, and an intermediate pressure chamber; said body having ports communicating with said inlet chamber; an inlet nipple secured to one of said ports; a high pressure gauge secured to the other of said ports; said body also having other ports communicating with said outlet chamber; a low pressure gauge secured to one of said other ports; a safety pressure relief device secured to another of said other ports; and an outlet nipple secured to still another of said other ports.

9. A multi-stage pressure regulator as claimed in claim 8, in which said unitary body has a partition separating the high pressure and the intermediate pressure chambers from the low pressure chamber, and both groups of ports are located in substantially the same plane as said partition.

10. A two-stage regulator for the reduction of high pressure gases comprising a unitary continuous body having at opposite ends thereof chambers the outer wall of each of which comprises a diaphragm, one of said diaphragms being of materially greater diameter than the other, said body having an inlet for gas and a passage leading from said inlet to the chamber having the smaller diaphragm, a valve operatively connected with the smaller diaphragm for controlling the flow of incoming gas, having a pressure of 70 atmospheres or more, to the chamber covered by said smaller diaphragm, a spring operating upon the outer face of the smaller diaphragm and means for setting the said spring to exert a predetermined pressure upon said smaller diaphragm, there being a passage leading from the chamber having the smaller diaphragm to the chamber having the larger diaphragm, a valve in the last-mentioned passage, a spring operatively engaging the outer portion of the larger diaphragm, and manually operated means for varying the tension of the last-mentioned spring.

11. A two-stage regulator for reducing the pressure of high pressure gases and regulating the delivery pressure thereof, comprising a unitary body having a high pressure chamber provided with an inlet, an intermediate pressure chamber in one end of the body, and a low pressure chamber in the other end of the said body provided with an outlet; said body having a wall separating said high pressure and intermediate pressure chambers from said low pressure chamber, a valve and a diaphragm associated with said intermediate pressure chamber, yielding means for actuating said valve; a second valve; a second diaphragm; and yielding means associated with the second diaphragm and disposed in the said low pressure chamber for actuating said second valve.

12. A two-stage regulator for reducing the pressure of high-pressure gases and for regulating the delivery pressure thereof, comprising a unitary body having a high pressure chamber provided with an inlet; an intermediate pressure chamber in one end of the body; and a low pressure chamber in the other end of the body provided with an outlet; said body having a wall separating said high pressure and intermediate pressure chambers from said low pressure chamber; a diaphragm forming a wall of the intermediate pressure chamber, a valve for controlling the flow of gas from the high pressure chamber to the intermediate pressure chamber and operatively associated with said diaphragm, a second diaphragm forming a wall of the low pressure chamber, the last-named diaphragm having a larger effective area than the first-named diaphragm, a second valve for controlling the flow of gas from the intermediate pressure chamber to the low pressure chamber and operatively associated with said second diaphragm, yielding means for actuating the first-named valve, and a second yielding means disposed in the low pressure chamber and adapted to close said second valve.

13. A multi-stage gas regulator for reducing and regulating the pressure of high pressure gases, comprising a unitary continuous body having a low pressure chamber in one end of the body, an intermediate pressure chamber in the other end of said body, and a thick transverse wall separating the said chambers; said wall having therein an inlet passage to said intermediate pressure chamber and a short passage connecting said intermediate pressure chamber with said low pressure chamber, portions of the wall at the said passages being bored and tapped to receive valve seat plugs extending within the respective chambers; tubular valve seat plugs secured in the respective tapped bores; valves having stems extending through said plugs, one stem extending into the intermediate pressure chamber and one into the low pressure chamber; one of the valves being adapted to control the flow of incoming gas having a pressure of 70 atmospheres or more to the intermediate pressure chamber; diaphragms extending across the respective chambers substantially parallel to each other and operatively associated with the respective valve stems; the diaphragm extending across the low pressure chamber having a larger effective area than the other diaphragm; and caps clamping the said diaphragms to the body and having therein springs exerting pressure upon the respective diaphragms.

14. A multi-stage pressure regulator comprising a unitary valve body having an intermediate pressure chamber in one end thereof arranged adjacent to a low pressure chamber in the other end thereof, a sturdy transverse wall separating said chambers; a pressure-responsive diaphragm closing the outer end of said intermediate pressure chamber; a pressure-responsive diaphragm closing the outer end of said low pressure chamber; said intermediate pressure chamber having an inlet passage; said wall having a relatively short passage adapted to connect said chambers; a valve having a head in each of said passages cooperating with a seat in each of said passages; said valves having their respective heads located substantially in the same transverse plane and having stems thereon operatively connected respectively to said intermediate and low pressure diaphragms; one of the said valves being adapted to control the flow of incoming gas having a pressure of at least 70 atmospheres.

15. A multi-stage fluid-pressure regulator comprising a compact unitary valve body having a partition extending transversely through a central zone of said valve body; said body having an intermediate pressure chamber on one side of said partition and an inlet thereto within said central zone and adjacent to said partition; said body having a low pressure chamber on the opposite side of said partition; said partition having a short passage extending therethrough establishing communication between said intermediate pressure chamber and said low pressure chamber; a pressure-responsive diaphragm having a small effective area adapted to close one side of said intermediate pressure chamber; a pressure-responsive diaphragm having a larger effective area adapted to close one side of said low pressure chamber; said diaphragms being substantially parallel to each other and to said partition; a valve in said short passage; a valve in said inlet to said intermediate pressure chamber; the last-named valve being adapted to control the flow to the intermediate pressure chamber of incoming gas having a pressure of 70 atmospheres or more; the said valves being offset laterally from each other and being controlled respectively by said low pressure and intermediate pressure chamber diaphragms.

16. A multi-stage pressure regulator comprising a unitary hollow body having a partition dividing its interior into two chambers closely adjacent each other, the said chambers having parallel axes but being laterally offset from each other; the first one of the chambers having a fluid inlet; the second of said chambers having a fluid outlet; said partition having a short passage connecting said chambers; a valve in said inlet adapted to control the flow of incoming gas under a pressure of 70 atmospheres or more; a valve in said short passage; a diaphragm closing one end of said first chamber and operatively connected to the valve in said inlet; a non-adjustable spring adapted to oppose the outward movement of said diaphragm; a diaphragm closing one end of said second chamber and operatively connected to the valve in said short passage; the last-mentioned diaphragm having a larger effective area than the other of said diaphragms; and a manually adjustable spring adapted to oppose the outward movement of said last-named diaphragm.

17. A multi-stage fluid-pressure regulator comprising a unitary body having a large low pressure chamber formed in one end thereof and having a smaller intermediate pressure chamber in the other end thereof; a relatively thick wall separating said chambers; the intermediate pressure chamber having a relatively short inlet passage; a relatively short passage connecting said chambers; the respective passages being bored and tapped on opposite sides of said wall; valve seats bearing against the bottoms of said bores; cup-shaped plugs screwed into said bores and clamping said seats in place; valves having heads seating against said seats and stems extending within said plugs; one of the said valves being adapted to control the flow of the intermediate pressure chamber of gas having a pressure of at least 70 atmospheres or more; diaphragms extending across and sealing the respective chambers; each of said diaphragms being operatively connected to a corresponding valve stem; springs encircling said stems within said plugs and compressed between said diaphragms and said plugs respectively; and caps clamping said diaphragms to said body and having springs therein pressing against said diaphragms; and the said body having therein ports for gauges to indicate the pressures of the incoming and outgoing gases, and a port having means for venting the said body when the gas therein attains a predetermined pressure.

18. A two-stage gas regulator for reducing the pressure of high pressure gases and regulating the delivery pressure thereof, comprising a unitary body having a high pressure chamber provided with an inlet, an intermediate pressure chamber in one end of said body, and a low pressure chamber in the other end of said body provided with an outlet, said body having a wall separating said high pressure chamber and said intermediate pressure chamber from said low pressure chamber, said wall having tapped bores in its opposite sides within the respective intermediate and low pressure chambers to receive valve seat plugs and also having a gas passage therethrough establishing communication between the intermediate pressure chamber and the tapped bore in the low pressure chamber; tubular valve seat plugs secured in the respective tapped bores in said wall; valves having stems extending through said plugs, one stem extending into the intermediate pressure chamber and one into the low pressure chamber; one of said valves being adapted to control the flow of gas from the high pressure chamber into the intermediate pressure chamber, and the other of said valves being adapted to control the flow of gas from the intermediate pressure chamber into the low pressure chamber; diaphragms respectively extending across the intermediate pressure chamber and the low pressure chamber, and operatively associated with the respective valve stems extending into the two last-named chambers, said diaphragms being disposed substantially parallel to each other, and the diaphragm extending across the low pressure chamber having a larger effective area than the other diaphragm; caps clamping said diaphragms to said body; and springs within said caps exerting pressure upon the respective diaphragms.

19. A multi-stage pressure regulator comprising a unitary valve body having a high pressure inlet and a low pressure outlet; a thick partition within said body separating the latter into an intermediate pressure chamber and a larger low pressure chamber; a pressure-responsive diaphragm closing said intermediate pressure chamber, and a pressure-responsive diaphragm closing said low pressure chamber; said low pressure diaphragm being parallel to said intermediate pressure diaphragm and having a larger effective area than the intermediate pressure diaphragm; said partition having therein an arcuate grooved portion forming a wall of the intermediate pressure chamber and in open communication with said high pressure inlet; a pressure gauge port extending through the said body at the said grooved portion; said partition having a second arcuate grooved portion within said low pressure chamber; a pressure gauge port, a pressure relief port, and the said low pressure outlet extending through the said body at the second grooved portion; a short passage connecting the said intermediate and low pressure chambers; a valve in said short passage; and a valve in said high pressure inlet; the said valves being controlled respectively by said low pressure and intermediate pressure diaphragms; one of the said valves being adapted to control the flow of incoming gas having a pressure of at least 70 atmospheres.

20. A two-stage regulator for reducing the pressure of high pressure gases and regulating the delivery pressure thereof, comprising a unitary body having a high pressure chamber provided with an inlet; an intermediate pressure chamber in the said body; and a low pressure chamber in the said body and provided with an outlet; said body having a thick wall portion separating said high pressure and intermediate pressure chambers from said low pressure chamber; a pressure-responsive diaphragm forming a wall of the intermediate pressure chamber; a valve for controlling the flow of gas from the high pressure chamber to the intermediate pressure chamber and operatively associated with the said diaphragm; a second pressure-responsive diaphragm forming a wall of the low pressure chamber; the last-named diaphragm having a larger effective area than the first-named diaphragm; a valve for controlling the flow of gas from the intermediate pressure chamber to the low pressure chamber and operatively associated with said second diaphragm; nonadjustable yielding means for actuating the first-named valve; adjustable yielding means for actuating said second valve; a pressure gauge port extending through the peripheral margin of the said body at the said wall and in communication with the intermediate pressure chamber; and a second gauge port extending through the periphery of the said body at the said wall and in communication with the low pressure chamber.

CHALMERS K. BRYCE.
HOMER W. JONES.

CERTIFICATE OF CORRECTION.

Patent No. 2,057,133.  October 13, 1936.

CHALMERS K. BRYCE, ET AL.

It is hereby certified that the name of the assignee in the above numbered patent was erroneously described and specified as "Union Carbide & Carbon Corporation" whereas said name should have been described and specified as Union Carbide and Carbon Corporation, a corporation of New York, as shown by the record of assignments in this office; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.